United States Patent

Krupka

[15] 3,696,294
[45] Oct. 3, 1972

[54] RMS VOLTAGE OR CURRENT SENSOR

[72] Inventor: Ronnie W. Krupka, Richardson, Tex.

[73] Assignee: ECC Corporation, Euless, Tex.

[22] Filed: Jan. 26, 1970

[21] Appl. No.: 5,671

[52] U.S. Cl. ................................. 324/105, 324/106
[51] Int. Cl. ............................ G01r 5/26, G01r 5/22
[58] Field of Search .......... 324/95, 106, 105; 73/355; 136/225

[56] References Cited

UNITED STATES PATENTS

| | | | |
|---|---|---|---|
| 3,440,536 | 4/1969 | Ronci | 324/106 |
| 3,533,855 | 10/1970 | Lederman et al. | 324/106 X |
| 3,237,101 | 2/1966 | Vaughan | 324/105 X |
| 3,345,561 | 10/1967 | Martin | 324/95 |
| 3,384,819 | 5/1968 | Rinkel | 324/106 X |
| 3,405,271 | 10/1968 | Stevens et al. | 136/225 X |
| 3,487,305 | 10/1969 | Selby | 324/95 |
| 3,147,436 | 9/1964 | Hopfer | 324/95 |
| 3,098,984 | 7/1963 | Martin | 324/95 X |
| 2,686,295 | 8/1954 | Griemsmann | 324/95 |
| 3,447,083 | 5/1969 | Luskow | 324/106 |

*Primary Examiner*—Rudolph V. Rolinec
*Assistant Examiner*—Ernest F. Karlsen
*Attorney*—Giles C. Clegg, Jr. and Peter J. Murphy

[57] ABSTRACT

A voltage or current sensor containing a heater resistor, a first heat responsive resistor in intimate thermal contact with the heater resistor, a second heat responsive resistor in intimate thermal contact with the ambient temperature, and insulator means separating the heater resistor and first heat responsive resistor from the second heat responsive resistor. A voltage or current to be measured is applied to the heater resistor, which produces a heat output that is proportional to the true RMS value of current flow through the heater resistor. This heat output is transmitted to the first heat responsive resistor, whose resistance value varies as a substantially linear function of temperature within a temperature range corresponding to the range of voltages or currents to be measured. The thermal resistance between the heat resistor and the first heat responsive resistor is much less than the thermal assistance between the heater resistor and a temperature reference comprising the case and a heat sink. A second heat responsive resistor has the same or opposite temperature coefficient of resistance of the first heat responsive resistor, and its resistance also varies as a substantially linear function of temperature, but since it is insulated from the heater resistor and is in intimate thermal contact with the temperature reference, its resistance will be determined by the ambient temperature rather than by the temperature of the heater resistor. Therefore, the resistance ratio of the first and second heat responsive resistors is proportional to the heat output of the heater resistor, which in turn is proportional to the true RMS value of voltage or current applied thereto and compensated for ambient temperature variations.

18 Claims, 14 Drawing Figures

PATENTED OCT 3 1972 3,696,294

INVENTOR
RONNIE W. KRUPKA

ATTORNEYS

INVENTOR
RONNIE W. KRUPKA

ATTORNEYS

RMS VOLTAGE OR CURRENT SENSOR

BACKGROUND OF THE INVENTION

In AC or pulsating DC circuits, it is often necessary to measure the RMS value of voltages or currents or to generate a signal which is proportional to the RMS value of such voltage or currents. The RMS value of such a current or voltage is its effective value as opposed to its peak value and is defined as the DC voltage or current level that will produce the same power output in a resistive load as the voltage or current in question. Since the power developed in a resistive load is equal to $I^2R$, or to $E^2/R$, the effective value for the voltage or current in question can be calculated mathematically by integrating $E^2$ or $I^2$ over one full cycle of the voltage or current waveform, dividing by the time period of the cycle to determine the mean value of the squared function, and then taking the square root of the mean value of the squared function. Thus, although the value determined by this calculation is defined as the "effective" value of the voltage or current in question, as opposed to its "peak" value, it has become known as the "Root-Mean-Square" or "RMS" value due to the mathematical operations by which it is calculated.

In cases where the AC waveform is sinisoidal, its RMS value will be equal to .707 times its peak value, and most of the prior art RMS voltage or current sensors have been based upon the principle of measuring the peak value of sinisoidal AC voltages or currents and multiplying the peak value by .707. But since there is no such thing as a perfect sine wave in practice, these prior art sensors only produced an approximate measure of the RMS value where the closeness of the approximation varied in accordance with the waveform of the measured voltage or current. Moreover, these prior art sensors cannot be used to measure irregular waveforms or non-sinisoidal waveforms such as square waves or sawtooth waves.

Still another type of RMS voltage or current sensor is not dependent upon wave form but rather it comprises a heater element to which a thermocouple is bonded. The output of the thermo-couple is a signal which is a function of the RMS value of the current flowing through the heater. However, such sensors are expensive to manufacture, fragile and the output signal is generally of a very low level. Accordingly, it is a principle object of this invention to provide an RMS voltage or current sensor which measures the true RMS value of a voltage or current independent of its waveform. It is an additional object of this invention to provide an RMS voltage or current sensor of the above-noted type which is small in size, simple in structure, and reliable in operation.

SUMMARY OF THE INVENTION

In accordance with this invention, the above noted objects are achieved by means of a heater resistor, a first heat responsive resistor in intimate thermal contact with the heater resistor, a temperature reference such as a case or heat sink and thermal conducting means providing a thermal resistance between the heater resistor and the temperature reference which produces a desired range of temperature difference for the range of RMS values of the input signal of interest.

The voltage or current to be measured is applied to the heater resistor, which produces a heat output that is proportional to the true RMS value of current flow through the heater resistor. This heat output is transmitted to the first heat responsive resistor, whose resistance value varies as a substantially linear function of temperature within a temperature range corresponding to the range of AC voltages or currents to be measured.

There is preferably provided a second heat responsive resistor having the same or opposite temperature coefficient of resistance as the first heat responsive resistor, and its resistance also varies as a substantially linear function of temperature. The second heat responsive resistor is insulated from the heater resistor and in intimate contact with the temperature reference, and accordingly its resistance will be determined by the ambient temperature rather than by the temperature of the heater resistor. Therefore, the resistance ratio of the first and second heat responsive resistors is proportional to the heat output of the heater resistor, which in turn is proportional to the true RMS voltage or current applied thereto and compensated for ambient temperature variations. The heater resistor and heat responsive resistors are preferably fabricated by thick or thin film techniques and packaged together in a relatively small housing to provide a small, compact unit which is simple in structure and reliable in operation.

DETAILED DESCRIPTION OF THE INVENTION

Figure 1:
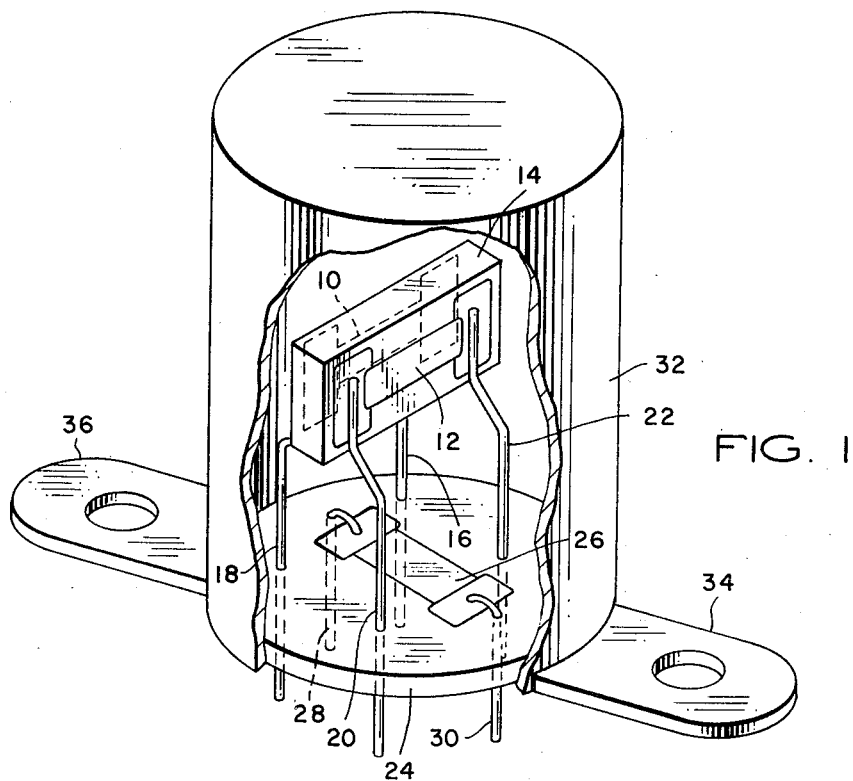
FIG. 1 is a cut-away perspective view of one illustrative embodiment of the invention.

FIG. 1 is a cut-away perspective view of one illustrative embodiment of the invention. In this embodiment, a heater resistor 10 and first heat responsive resistor 12 are deposited by means of thick film techniques on opposite sides of a relatively thin slab of substrate material 14. Metallic contact pads are deposited on substrate 14 at opposing ends of both resistor elements, and metallic wire elements 16, 18, 20 and 22 are bonded using solder, ultrasonic, welding, or other conventional techniques to respective contact elements to serve as the resistor leads and also to support the substrate 14 above a base plate 24 through which the metallic wire elements pass. The substrate 14 and base plate 24 are both made of a material which has a relatively low value of electrical conductivity and a relatively high value of heat conductivity so as to serve both as electrical insulators and heat conductors. In like, particular embodiment of the invention, the material employed is beryllium oxide ceramic, but it will be understood by those skilled in the art that other materials could be employed if desired, e.g. alumina ceramic, steatite, or the like. depending on the particular electrical and thermal requirements of any given application of the invention.

Base plate 24 is attached at its periphery to a metallic housing 32 which is adapted by means of projecting ears 34 and 36 to be attached to a chassis or printed circuit board over an opening that it large enough to let the resistor leads extend therethrough. Alternately, the housing 32 could have a stud mounted on its top or could be either swedged or press-fitted for mounting in an inverted position with the resistor leads projecting from the top of the housing instead of the bottom. The type of mounting employed will depend upon the particular physical, electrical, and thermal requirements of any given application of the invention. As far as accuracy of operation is concerned, however, it is preferable to mount the invention in whichever position provides the most stable ambient temperature for base plate 24.

If the ambient temperature to which the device is subjected remains constant, the device as described above is suitable for use. However, if ambient temperature is subject to change, greater accuracy can be provided if a second heat responsive resistor 26 is deposited on the upper surface of base plate 24 between metallic contact plates to which corresponding metallic wire elements 28 and 30 are attached to serve as leads. The second heat responsive resistor 26 should have a temperature coefficient of resistance either the same as or opposite to that of the first heat responsive resistor 12.

Figure 2:
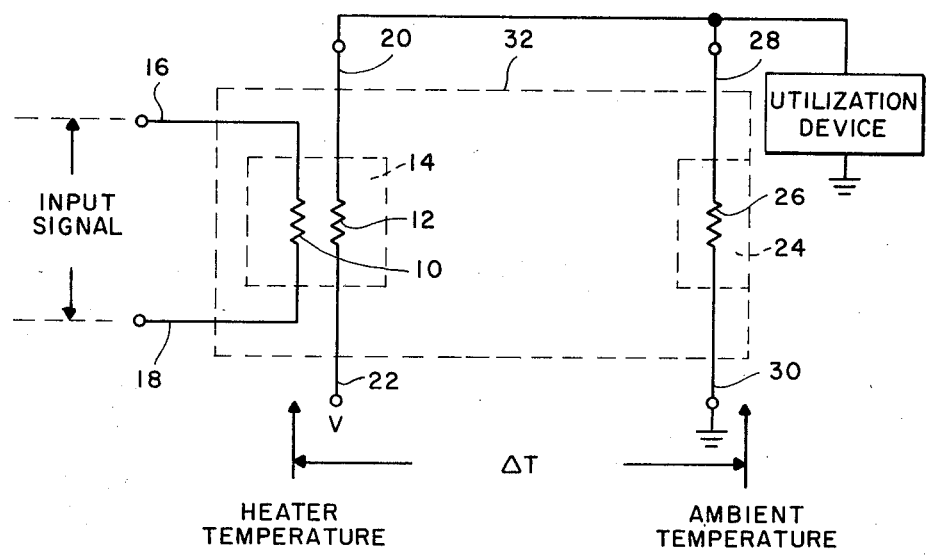
FIG. 2 is a schematic circuit diagram of the preferred embodiments of the invention.

FIG. 2 is a schematic diagram illustrating the preferred sensor of the present invention and manner in which it can be used. The voltage or current whose RMS value is to be sensed is applied to resistor 10 through leads 16 and 18. This produces a heating effect proportional to $I^2R$, where R is the resistance of resistor 10 and I is the current flowing through the resistor. The heating effect in heater resistor 10 is independent of wave shape and is a function of the true RMS value of input signal. Preferably, resistor 10 has a zero temperature coefficient of resistance in order that changes in its resistance will not cause variations in the power-signal relationship. The heating effect is also a function of thermal resistance between heater 10 and temperature reference comprising the case 32 and base plate 24. The thermal resistance required to produce a temperature difference $\Delta T$ for an RMS value of applied current is provided by the leads. The temperature difference $\Delta T$ is determined in accordance with equation (1) as follows:

$$\Delta T = P \Theta_h \qquad (1)$$

where: $\Delta t$ = temperature difference $P$ = power supplied $\Theta_h$ = thermal resistance between heater and temperature reference The heat generated by heater resistor 10 is transmitted through substrate 14 to heat responsive resistor 12, whose resistance varies as a substantially linear function of temperature within a temperature range corresponding to the range of input signals. The temperature coefficient of resistance for resistor 12 can be either positive or negative. The substrate 14 which separates resistors 10 and 12 is preferably made of material which has a relatively high electrical resistivity and which provides a desired low thermal resistance between resistors 10 and 12, such as beryllium oxide ceramic, alumina ceramic, steatite, or the like. The thermal resistance between resistors 10 and 12 is important in that it determines the temperature of resistor 12 as a function of the temperature of resistor 10 in accordance with equation (2) as follows:

$$T_1 = T_2 \Theta_2 / (\Theta_1 + \Theta_2) \qquad (2)$$

where:
$T_1$ equals temperature of resistor 12
$T_2$ equals temperature of resistor 10
$\Theta_1$ equals thermal resistance between resistors 10 and 12
$\Theta_2$ equals thermal resistance between resistors R12 and temperature reference From the foregoing, it can be seen that if thermal resistance $\Theta_1$ between resistors 12 and 10 is small, the temperature of resistor 12 will be substantially the same as the temperature of heater resistor 10.

The thermal time constant of the device is also important since approximately five time constants are required for the temperature of any element to change from an initial temperature to a final temperature. One time constant is equal to $\Theta \gamma$ where $\Theta$ is the thermal resistance and $\gamma$ is the heat capacity. It will be noted in this regard that the over-all time constant of the sensor will be the sum of the time constant of the individual elements. In practice, the system time constant can be made to be substantially equal to the time constant provided by the conductive leads which provide the required thermal resistance between the resistors 10 and 12 and the temperature reference since the heat capacity and thermal resistance of the resistors 10 and 12 and of substrate 14 can be made very small.

The thermal response time of the device can be adjusted to produce required results by controlling the various thermal resistances and thermal masses. However, in general, it is preferred that the thermal time constant of resistor 12 be as short as compared to the thermal time constant of the sensor and the over-all thermal time constant of the sensor be as short as compared to the period of variation in steady state level of applied input signal. It is also desirable that the thermal mass of the temperature reference be large as compared to that of the sensor element to minimize the sensitivity of the device to changes in ambient temperature and assure that changes in ambient temperature will produce the same change in temperature of resistors 12 and 26 at substantially the same time.

Figure 3:
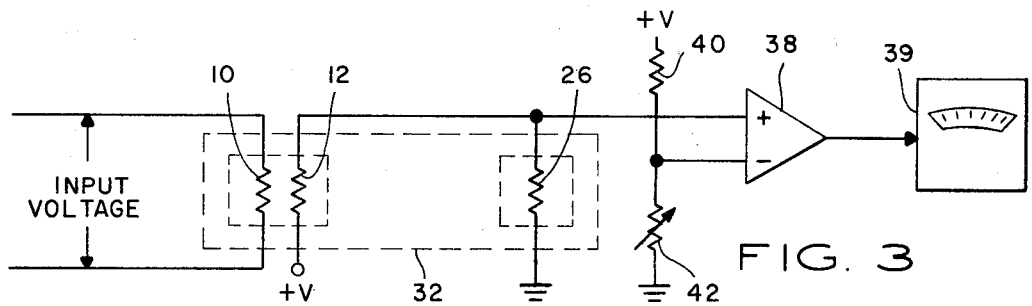
FIG. 3 is a schematic circuit diagram of one illustrative circuit for utilizing the embodiment of FIG. 2.
Figure 14:
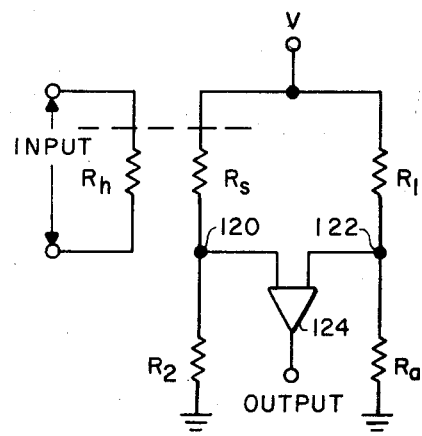
FIG. 14 is a schematic diagram of another illustrative circuit utilizing a sensor in accordance with the present invention.

From the foregoing, it can be seen that the temperature of the heat sensitive resistor 12 will vary as a function of the power applied to resistor 10, which in turn is the function of RMS value of the current voltage applied to the input terminals. The change in resistance of resistor 12 therefore provides an indication of the RMS value of the input signal. Changes in the resistance of resistor 12 can be detected on a bridge circuit as shown in FIGS. 3 or 14 or in a more simplified circuit as shown in FIG. 2 of the drawings. Thus, it is practical to connect the resistor 12 in series with a resistor across a source of voltage V. The voltage developed across the resistor, such as resistor 26, can then be applied to utilization device 21 which may, for example, be a meter or an amplifier. Utilizing device can be adjusted to provide zero output when there is zero input if desired.

It is important to note that if the ambient temperature does not change to any great degree or if maximum accuracy is not required, the heat responsive resistor 26 of FIG. 1 is not required and any suitable resistance can be incorporated into the circuit of FIG. 2, or the circuits of FIGS. 3 and 14 as replacement for the second heat responsive resistor. Compensation for variation in ambient temperatures can be obtained by utilizing resistor 26 as changes in ambient temperatures will produce the same percent change in resistance of both resistors 12 and 26.

In accordance with one specific example of the invention, the substrate material was beryllium oxide ceramic which was 0.02 inches thick, 0.10 inches long, and 0.10 inches wide. The heater resistor 10 was a thick film deposit of resistance material which had zero temperature coefficient of resistance and the heat responsive resistor 12 was a thick film deposit of resistance material which had a negative temperature coefficient of resistance equal to −0.70 percent/C°. The resistance value of both resistors was approximately 14K and the thermal time constant of the device was in the order of 100 ms. Since the time duration of one cycle of a 60 cps supply voltage is equal to approximately 17 milliseconds, the temperature of the assembly would stabilize within 5 time constants or 30 cycles following the change in the input voltage level of the 60 cycle power.

Figure 4:
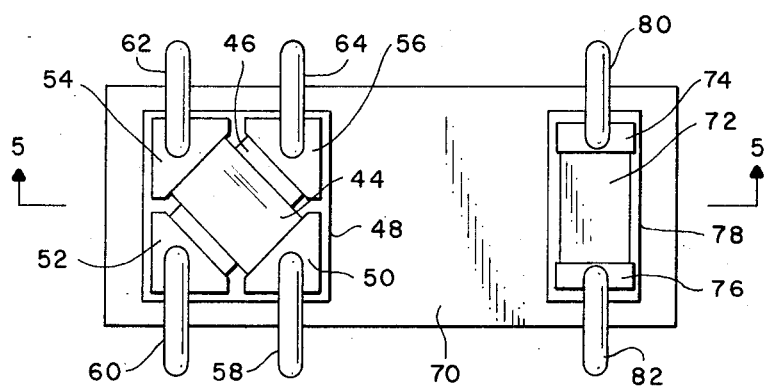
FIG. 4 is a plan view of a second embodiment of the invention.
Figure 5:
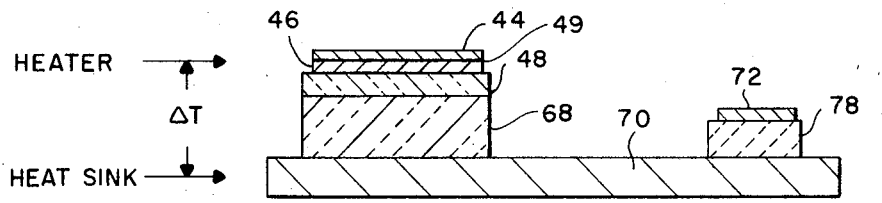
FIG. 5 is a cross sectional view taken on the plane 5—5 of FIG. 4.

FIG. 3 shows another illustrative circuit for utilizing the above-described embodiment of the invention. Resistors 12 and 26 are connected in series between a voltage source +V and ground. The junction between resistors 12 and 26 is coupled to one input of a differential amplifier 38, whose other input is coupled to a variable voltage divider comprising resistor 40 and potentiometer 42. The potentiometer 42 is adjusted to equalize the input signals to amplifier 38 under initial conditions (i.e. zero input) so that the output of amplifier 38 will initially be zero. When an input signal is applied to heater resistor 10, the resistance ratio of resistors 12 and 26 changes, which changes the corresponding input signal to amplifier 38 and produces an output signal which is a function to the change of resistance ratio. The output signal can be applied to drive a meter 39 as shown in FIG. 3 or it can be utilized in many other different types of circuits. FIGS. 4 – 13 show alternate structural configurations for the sensor of this invention. Referring to FIGS. 4 and 5, for minimum thermal response time between the heater resistor and the associated heat responsive resistor, the heater resistor 44 and its associated heat responsive resistor 46 can be deposited one on top of the other on a substrate 48 with a thin film of insulator material 49 between them to prevent electrical interaction. Triangular metallic contact areas 50, 52, 54 and 56 are deposited on the four corners of substrate 48 to serve as the contacts of the two resistors, and metallic conductors 58, 60, 62 and 64 are bonded to respective contact areas to provide output leads. Substrate 48 is mounted on top of an insulator block 68 that rests on top of a base plate 70, which serves as a temperature reference. A second heat responsive resistor 72 and its associated contact areas 74 and 76 are deposited on top of a second substrate 78 which is mounted on top of base plate 70 at a laterally separated position from the other insulator block 68. Both of the substrates 48 and 78 are made of beryllium oxide ceramic or some other material which has a relatively low value of electrical conductivity and a relatively high value of heat conductivity. The insulator block 68 is made of plastic, epoxy, glass, or some other suitable heat insulator material such as the pressed boron nitride ceramic shown in FIG. 6.

Figures 6, 8:
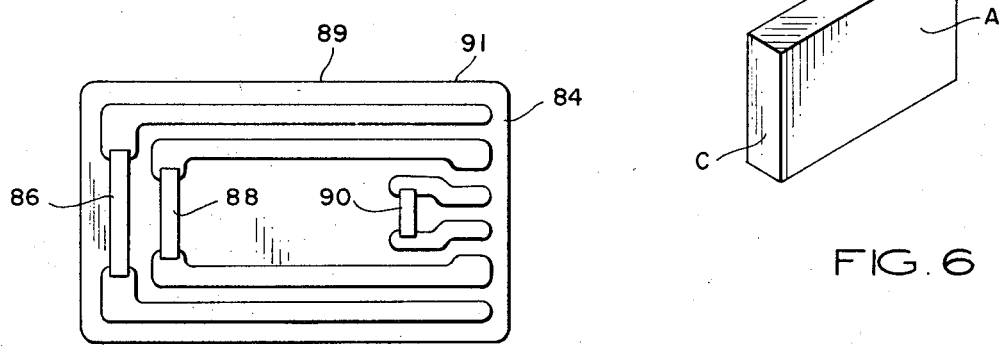
FIG. 6 is a perspective view of a block of ceramic suitable for use in the practice of the invention.
FIG. 8 is a plan view of a third embodiment of the invention.

Boron nitride ceramic is an excellent ceramic material for use as the insulator block when the thermal response time of the device is not critical. Referring to FIG. 6 of the drawings, pressed boron nitride ceramic is characterized by a relatively good coefficient of thermal conductivity along plane A, in the order of 0.146. Accordingly, the thermal resistance of this ceramic along plane A is relatively low, approximately 0.644 L/A. On the other hand, the coefficient of thermal conductivity along plane C is very low, approximately 0.00397. It will be noted that such a coefficient of thermal conductivity is of the same order of magnitude as other heat insulating materials such as plastic, epoxy, or glass.

Figure 7:
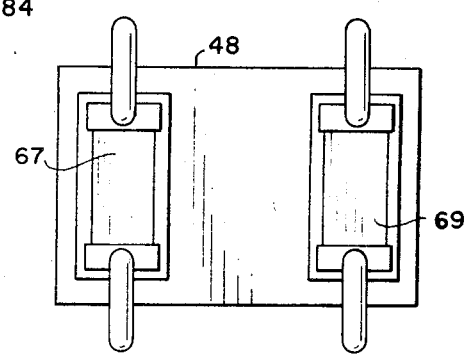
FIG. 7 illustrates a modification of the embodiment shown in FIG. 5.

If the response time of the device is not critical, an arrangement generally the same as that shown in FIGS. 4 and 5, but wherein a heater resistor 67 and a heat responsive resistor 69 are deposited between corresponding contact areas on the surface of the substrate 48 with the resistor strips closely adjacent to one another as shown in FIG. 7 rather than overlying one another. In such an embodiment of the invention, use of the pressed boron nitride ceramic as insulator 68 is particularly advantageous in that a thinner piece of substrate 48 can be used without increasing the thermal resistance between the resistor 67 and the resistor 69.

Figure 9:
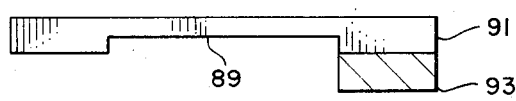
FIG. 9 is a side elevation view of a sensor shown in FIG. 8 of the drawings.
Figure 10:
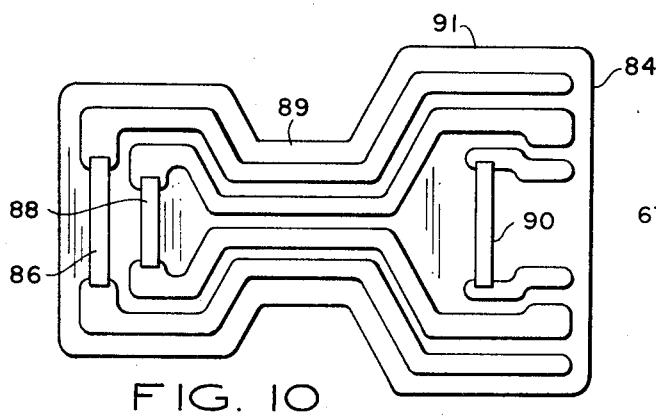
FIG. 10 is a plan view of a fourth embodiment of the invention.

FIG. 8 shows a substrate 84 upon which a heater resistor 86, first heat responsive resistor 88, and second heat responsive resistor 90 are deposited between corresponding metallic conductor strips which all terminate in contact areas at one end of substrate 84. In this embodiment of the invention, the required thermal relationships are achieved by spacing in a single plane. In application, the contact area end of the substrate would be plugged into a matching card holder whose metallic contact elements would serve as the temperature reference. The thermal relationship between the heat sink and the various resistors, and their thermal relationship with each other, are determined by the length and mass of the conductor strips, the substrate, and by the geometrical positioning of the resistor elements. The thermal resistance between resistor 90 and resistors 86 and 88 can be increased, if required, by making the intermediate portion 89 of substrate 84 of reduced cross section as shown in FIGS. 9 and 10. Only the end 91 of the substrate underlying the resistor 90 would be in intimate thermal contact with the heat sink 93. A similar reduction in area and corresponding increase in thermal resistance can be obtained by shaping the substrate as shown in FIG. 10.

Figure 11:
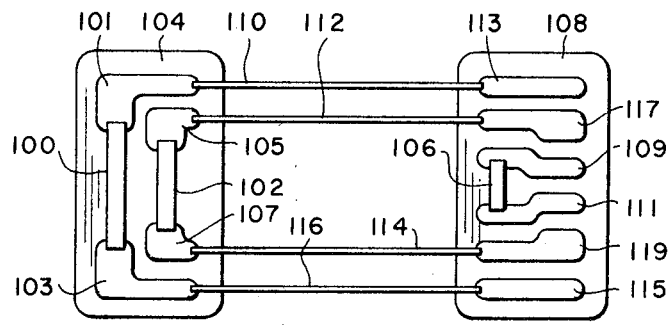
FIG. 11 is a plan view of a sensor in accordance with a fifth embodiment of the invention.
Figure 12:
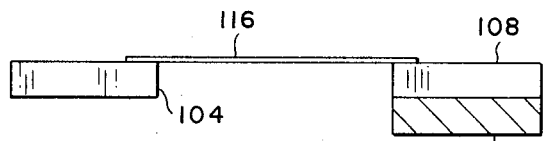
FIG. 12 is a side elevation view of a sensor as shown in FIG. 11 of the drawings.
Figure 13:
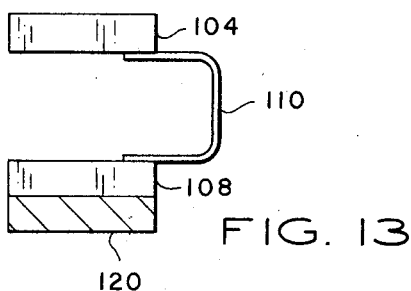
FIG. 13 is a side elevation view illustrating a different arrangement of a sensor as shown in FIG. 11 of the drawings.

Still another embodiment of the invention is shown in FIGS. 11, 12 and 13 of the drawings wherein heater resistor 100 and a first heat responsive resistor 102 are deposited on a substrate 104 and a second heat responsive resistor 106 is deposited on the second substrate 108. It will be noted that the resistor 100 extends between contact areas 101 and 103 formed on substrate 104 while resistor 102 extends between contact areas 105 and 107, also formed on substrate 104. Contact areas 113 and 115 are provided on substrate 108 for making connection to the input signal whose effective level is to be sensed. Contact areas 117 and 119 are provided for making electrical contact to resistor 102 whose resistance provides an indication of effective level of the input signal. Contact areas 109 and 111 are provided on substrate 108 for making contact to resistor 106. Substrate 108 is suitably bonded to and becomes a part of the temperature reference 120. Copper leads 110, 112, 114 and 116 connect appropriate contact areas on substrate 104 to the associated contact areas on substrate 108 providing both electrical connection between the two substrates and the required thermal resistance. The substrate 104 can be supported in a cantilever fashion as shown in FIG. 12 or the leads can be bent as shown in FIG. 13 to support substrate 104 in opposed relationship to substrate 108.

The contact areas 109, 111, 113, 115, 117 and 119 formed on the substrate 108 are suitably of the type which can be used in a plug in socket of the type conventionally used with printed circuit elements. In such an instance, it may not be necessary to incorporate the thermal reference 110 into the device but rather use the chassis in which the substrate is plugged as the thermal reference. Also, the thermal resistance between resistor 100 and resistor 102 will normally be greater when the two resistors are defined on the same surface of the substrate rather than on opposite surfaces of the substrate. However, the thermal resistance between resistors 100 and 102 will generally be so small compared to the thermal resistance between heat resistor 100 and the temperature reference 120 that the slight increase in thermal resistance between the two resistors will not be consequential.

As mentioned previously, the heat responsive resistors can be either the same or opposite temperature coefficients of resistance. In FIG. 3 of the drawings there was shown an exemplary bridge circuit suitable for use in those instances in which the two heat responsive resistors are of the same temperature coefficient of resistance. A bridge circuit suitable for use when the two heat responsive resistors are of opposite temperature coefficient of resistance as shown in FIG. 14 of the drawings wherein the heater resistance to which input signal is applied is denoted as $R_h$, the first heat responsive resistor is designated as the sensing resistor $R_s$ and the second heat responsive resistor is designated $R_a$. In the circuit of FIG. 14, the upper terminal of each of the resistors $R_s$ and $R_1$ are connected to a voltage supply V. The under terminal of resistor $R_s$ is connected through resistor $R_2$ to ground and the under terminal of resistor $R_1$ is connected through resistor $R_a$ to ground. The output of the circuit is taken across terminals 120 and 122. In the circuit of FIG. 14, resistors $R_1$ and $R_2$ can be of conventional type provided their temperature coefficients of resistance are substantially the same. However, preferably resistors $R_1$ and $R_2$ are characterized by a temperature coefficient of resistance of zero.

As an input signal is applied across resistor $R_h$, its temperature will increase in the manner described previously providing a temperature differential relativity between $R_h$ and the temperature reference on which resistor $R_a$ is mounted. The resistor $R_s$ will be at very near the same temperature as the resistor $R_h$ and its resistance will be a function of the RMS value of the applied input signal. If the ambient temperature changes, to produce a ten per cent change in resistance of resistors $R_a$ and $R_s$, the resistance of one of the resistors will increase by ten per cent and the resistance of the other will decrease by ten per cent. However, the potential across output terminals 120 and 122 will remain constant and the output of the utilizing device such as differential amplifier 124 will also remain constant. Accordingly, even though the resistors $R_a$ and $R_s$ have opposite temperature coefficients of resistances, changes in ambient temperature will not substantially effect the output of the device.

Although the invention has been described with reference to particular preferred embodiments thereof, many changes and modifications will become apparent to those skilled in the art in view of the foregoing description which is intended to be illustrative and not limiting of the invention defined in the claims.

What is claimed is:
1. An RMS signal sensor comprising:
   a. a temperature reference whose temperature is stable, said temperature reference including a first substrate and a case;
   b. a second substrate;
   c. a substrate assembly comprising first and second films of resistive material deposited on said second substrate to define a heater resistor and a first heat responsive resistor;
   d. the material of said first film having a much lower temperature coefficient of resistance than the material of said second film;
   e. spaced conductor means passing through said first substrate for making electrical connection to said heater resistor for applying an input signal thereto whose RMS value is to be sensed and for making electrical connection to said first heat responsive resistor, said conductor means supporting said substrate assembly within the case and providing a first thermal resistance between the substrate assembly and the temperature reference; and
   f. a third film of resistive material deposited on the first substrate to define a second heat responsive resistor, the thermal resistance between the temperature reference and said second heat responsive resistor being low;

g. said first and second substrates each being of a high resistivity material to provide a high electrical resistance between said conductors and between said films and each having a low thermal resistance;

h. the second substrate providing a second thermal resistance between the first film and the second film which is low compared to the first thermal resistance;

i. the thermal time constant of the substrate assembly being short as compared to the thermal time constant of the temperature reference.

2. A sensor as defined in claim 1 wherein the thermal time constant of said substrate assembly is short as compared to the elapsed time between changes in steady state levels of the input signal.

3. A sensor as defined in claim 1 wherein the heater resistor is characterized by a temperature coefficient of resistance of substantially zero.

4. A sensor as defined in claim 1 wherein the heater resistor and the first heat responsive resistor are deposited on opposite sides of said substrate.

5. A sensor as defined in claim 1 wherein the heater resistor and the first heat responsive resistor are deposited on the same surface of said substrate.

6. A sensor as defined in claim 1 wherein the thermal mass of said substrate, assembly is small compared to the thermal mass of said spaced conductor means.

7. A sensor as defined in claim 1 wherein the temperature coefficient of resistance of said second heat responsive resistor is substantially the same as or opposite to the temperature coefficient of resistance of said first heat responsive resistor.

8. A sensor as defined in claim 1 wherein the thermal resistance between the heater resistor and said second heat responsive resistor is much greater than the thermal resistance between the heater resistor and the first heat responsive resistor.

9. A sensor as defined in claim 8 wherein said substrate is shaped to increase the thermal resistance between said heater resistor and said second heat responsive resistor.

10. A sensor as defined in claim 1 wherein the second substrate is characterized by relatively low temperature coefficient of resistance along at least one plane, said heater resistor and said first heat responsive resistor being carried by said substrate and electrically insulated from one another.

11. A sensor as defined in claim 1 wherein said heater resistor and said first heat responsive resistor overlie the other and is insulated therefrom by film of insulating material.

12. A sensor as defined in claim 1 wherein the thermal resistance between said temperature reference and said first heat responsive resistor is much greater than the thermal resistance between said temperature reference and said second heat responsive resistor.

13. A sensor as defined in claim 1 wherein said substrates are of materials selected from a group consisting of beryllium oxide ceramic, alumina ceramic and steatite.

14. A sensor as defined in claim 1 wherein said second substrate is of beryllium oxide ceramic.

15. A sensor as defined in claim 1 wherein said temperature reference includes a heat sink.

16. A sensor as defined in claim 1 further including means providing an output signal having characteristics which vary as a function of changes in temperature of said first heat responsive resistor.

17. A sensor as defined in claim 1 further including means providing an output signal having a characteristic which varies as a function of the temperature difference between the first and second heat responsive resistors.

18. A sensor as defined in claim 17 wherein said means comprises a bridge circuit including said first and second heat responsive resistors.

* * * * *